3,804,884
Patented Apr. 16, 1974

3,804,884
ESTERIFICATION PROCESS AND CATALYST THEREFOR
Gaines Clayton Jeffrey, Houston, and Wallace Eldon Embrey, Lake Jackson, Tex., assignors to The Dow Chemical Company, Midland, Mich.
No Drawing. Filed Dec. 7, 1972, Ser. No. 313,118
Int. Cl. C07c 69/54
U.S. Cl. 260—486 B                9 Claims

ABSTRACT OF THE DISCLOSURE

Production of hydroxyalkyl acrylates from an alkylene oxide and acrylic acid is accomplished with improved conversions and yields and virtual elimination of polymer and by-product formation by employing a macroporous anion exchange resin of the styrene-divinyl benzene type having (1) a water swelling capacity of from about 75% to 250% by volume, (2) an ion exchange capacity of about 2 to 4 milliequivalents per gram, and (3) from about 5 to 50% by wt. unsubstituted aromatic rings.

BACKGROUND OF THE INVENTION

The use of ion exchange resins to catalyze various acid or base catalyzed reactions is well known to the art. For example, Bortnick U.S. Pat. 3,037,052 describes the use of macroporous cation exchange resins as a catalyst. The esterification of an alkylene oxide by reaction with a carboxylic acid is catalyzed by macroporous anion exchange resins in hydroxide or chloride form, and in fixed bed or fluid bed processes. A recent improvement using a carboxylic acid salt is described in Wheeler & Stearns U.S. Pat. 3,340,295.

BRIEF SUMMARY OF THE INVENTION

It has now been found that certain macroporous anion exchange resins are superior esterification catalysts with greatly improved overall performance in terms of catalyst life, activity, and reduced polymer formation. More specifically, the improved catalysts are strong base anion exchange resins prepared from a macroporous styrene-divinyl benzene and characterized as having (1) a water swelling capacity of about 75% to about 250% by volume, volume, (2) a dry weight anion exchange capacity of about 2 to about 4 meq./g. in chloride form, and (3) about 5 to 50% by wt. unsubstituted aromatic rings.

The anion exchange resins which possess the above characteristics are unique as esterification catalysts, especially for the reaction of an alkylene oxide with an unsaturated carboxylic acid to produce a hydroxyalkyl unsaturated carboxylic acid ester such as hydroxyethyl acrylate. The resins possess high activity, substantially eliminate polymer formation and minimize by-product formation. Contrary to what is taught in the art, not all basic anion exchange resins make desirable catalysts for esterification reactions and the ionic form of the resin apparently makes no difference, so long as the charasteristics specified are present.

DETAILED DESCRIPTION OF THE INVENTION

The present invention is directed to the preparation of esters by the reaction of a carboxylic acid with an alkylene oxide in the presence of an anion exchange resin. The invention finds particular application in the preparation of the esters of unsaturated carboxylic acids.

When it is attempted to prepare a lower β-hydroxyalkyl ester of either acrylic or methacrylic acid, the polymerizable nature of these acids and of the product becomes a complicating factor. Attempts to shorten reaction time by an increase in reaction temperature are defeated by the thermally induced polymerization of the reactant acid and of the ester product.

The formation of polymer has been a principal difficulty in the effort to commercialize a process for preparing the β-hydroxyalkyl esters of acrylic and methacrylic acids.

It has now been discovered that three properties of the macroporous resin catalysts are critically important to the succesful operation of the process to obtain good yields and low by-product formation, especially polymers. The three properties which must be concurrent and carefully controlled within certain limits are (1) water swellability, (2) ion exchange capacity and (3) the extent of substitution of quaternary groups on the pendant aromatic rings of the resin as more specifically defined below.

Suitable macroporous anion exchange resins can be prepared by adding quaternary ammonium anion exchange groups to a macroporous cross-linked styrene-divinyl benzene copolymer by chloromethylation and amination as described, for example, by Mindick & Svarz U.S. Pat. 3,549,562 and Corte & Meyer U.S. Pat. 3,637,-535. Commercial macroporous anion exchange resins of this type, such as Amberlite IRA–900 and Dowex SBR resins, can be used provided their properties are within the defined limits.

Three properties are critical for the improved resin catalyst: (1) a water swelling capacity of about 75% to 250% by volume, (2) a dry weight anion exchange capacity of about 2 to 4 meq./g. in chloride form, and (3) about 5% to 50% by wt. of unsubstituted aromatic rings. Although the degree of resin cross-linking and other process variables have an important effect on these properties. it is these functional properties which define the improved catalyst. Other properties of the macroporous resin, including pore size and pore size distribution, apparently have little or no significant effect on the ability of the resin to perform satisfactorily as a catalyst for the esterification reaction.

The water swellability of the resin is an indication of its ability to be penetrated by the molecules of the reactants which thus reach the active sites within the resin structure and there react. The swelling property of the resin is affected by the amount of cross-linker in the base copolymer, e.g. the divinyl benzene. The preferred copolymer contains from 4–7 percent by weight cross-linker. Less than 4 percent cross-linker produces a weak resin which does not hold up well in use either in fixed or fluid beds. Broken resin beads cause clogging and increased pressure drop. Greater than 7 percent cross-linker causes reduced swelling, thus making it difficult for the reactant molecules to penetrate the resin beads to reach the reactive sites, thus effectively decreasing the sites available. The percent swell in water is measured on a dry volume basis.

The ion exchange capacity, while not as important in a catalytic process as in an ion exchange process, must be sufficient to provide an acceptable rate of reaction. Thus, an exchange capacity of about 2 to about 4 meq./g. has been found to provide sufficient reactive sites to allow a reasonable rate of reaction. A capacity of 2.5 to about 3.8 meq./g. is preferred. The exchange capacity is determined by conventional methods and is based on dry weight in chloride form.

It is also necessary that at least 5% but not more than about 50% of the aromatic rings of the resin be free of substituents other than the backbone polyalkylene chain. Such rings are commonly termed unsubstituted reflecting the absence of functional ion exchange groups. Preferably the catalyst has about 15 to 40% unsubstiuted aromatic rings. The degree of substitution is conveniently determined by infrared spectrography.

In practice, the degree of aromatic substitution of the anion exchange resin catalysts is determined primarily by the chloromethylation step since amination to introduce the active catalytic sites is essentially quantitative. Standard chloromethylation techniques are used with a macroporous styrene-divinyl benzene copolymer, normally with excess chloromethyl methyl ether and a Friedel-Crafts catalyst such as zinc chloride, stannic chloride, ferric chloride, or aluminum chloride at 20–75° C. Careful control is essential to produce more uniform distribution of catalytic sites and to minimize methylene bridging and consequent loss of the essential water-sweling capacity. Particularly effective is chloromethylation at about 50–57° C. with zinc chloride as catalyst. Thereafter amination with trimethylamine yields the catalytic resin.

In most applications for ion exchange resins, such as water purification, which involve the exchange capacity, the properties noted as desirable for the esterification catalyst are not critical. Conversely, most properties which make good ion exchange resins for normal exchange purposes, such as high ion exchange capacity, resin durability, and non-fouling by organics, are of lesser importance in the esterification reaction. This has not heretofore been recognized in the art.

50 grams ethylene oxide (EO) was used in each run. Reactions were conducted for 20 minutes at 73° C. in each run. Reaction products were removed from the reactor, and unreacted ethylene oxide vacuum flashed from the product. Percent unreacted acrylic acid (EO-free basis) was determined by titration with standard sodium hydroxide using a weighed sample. Successive 20-minute runs were made for each resin until reproducible activity was obtained. Relative activity was then determined based on the amount of unreacted acrylic acid present in products prepared from the various resin catalysts under equilibrium conditions. Products were analyzed for soluble polymer by a turbidimetric method in which the soluble polymer was precipitated by styrene addition and turbidity read on a photometer. For comparison, the soluble polymer data was reduced to relative numbers.

Results are given in Table I. The descriptions good, fair and poor as applied to the catalysts in this and following examples refers to their overall performance which includes catalyst life, by-product and polymer formation, and the activity of the catalyst.

TABLE I

| | Percent DVB [1] | Resin swell (percent) [2] | Unsubstituted aromatic rings (percent) [2] | Ion exchange capacity, meg./ dry, g. | Catalyst performance | Relative activity | Relative polymer formation |
|---|---|---|---|---|---|---|---|
| Batch number: | | | | | | | |
| 1 | 6 | 185 | 20 | 3.60 | Good | 1.00 | .06 |
| 2 | 6 | 127 | 25 | 3.42 | do | .98 | .07 |
| 3 | [3] 6 | 112 | 38 | 2.90 | do | .96 | 0 |
| 4 | [4] 6 | 112 | 27 | 3.06 | do | .94 | .09 |
| 5 | 4 | 240 | 5.5 | 3.97 | do | .85 | .07 |
| 6 | 6 | 124 | 15 | 3.82 | do | .84 | 0 |
| 9 | 6 | 74 | 50 | 2.37 | Fair | .68 | .01 |
| 10 | 6 | 93 | .7 | 4.10 | Poor | .68 | 1.00 |
| 11 | 8 | 49 | 25 | 3.28 | do | .60 | .22 |
| 12 | [4] 4 | 90 | 1.7 | 4.53 | do | .50 | .64 |
| 13 | [4] 6 | 45 | 1.0 | 4.27 | do | .38 | .55 |
| 14 | 6 | 125 | 26.0 | 3.16 | Good | .96 | 0 |

[1] The halomethylation reaction was accomplished using ZnCl₂ as catalyst except as noted in Batch Nos. 3, 4, 12, and 13, where the chlorides of the indicated metals were used.
[2] Percent resin swell is by volume and unsubstituted rings by weight.
[3] Sn.
[4] Fe.

EXAMPLES 1–13

(A) A series of strongly basic macroporous anion exchange resins was prepared by chloromethylation and amination of styrene-divinyl benzene copolymer beads containing about 4–7% DVB. Typically about 600 to 1000 pounds of chloromethyl methyl ether and about 20 to 50 pounds of zinc chloride catalyst were used with 100 pounds of copolymer, at a temperature of 50° to 57° C. for about 2 to 3 hours. The resin is then quaternized by reacting with aqueous trimethylamine at about 40° to 60° C. The recovered resin was washed with water, dilute HCl, and again with water before measuring its properties and catalytic activity.

(B) To evaluate the resins as esterification catalysts, a 300 cc. stainless steel, rocking reactor in a constant temperature bath was used. A reactor charge of 15 grams (dry weight) of resin, 15 grams acrylic acid (AA), and Example 14

Different samples of marcoporous anion exchange resins available from commercial sources were tested as catalysts in the manner described above and also characterized by the properties indicated as significant for desired performance. Results are shown in Table II. Large variations in the properties of the commercially available ion exchange resins are readily apparent. It should be noted that only one of the samples shown in Table II was satisfactory for the esterification reaction.

TABLE II

| Sample number [1] | Resin swell (percent) [2] | Unsubstituted aromatic rings (percent) [2] | Ion exchange capacity, meg./ dry, g. | Catalyst performance | Relative activity | Relative polymer formation |
|---|---|---|---|---|---|---|
| 1 | 25 | 3.1 | 4.32 | Poor | .51 | >1.0 |
| 2 | 105 | 5.4 | 4.17 | do | .45 | .31 |
| 3 | 98 | 26.0 | 4.10 | Fair | .50 | .26 |
| 4 | 90 | 9.8 | 3.86 | Poor—low life | .28 | .24 |
| 5 | 50 | 3.2 | 4.21 | Poor | .36 | >1.0 |
| 6—Gel | 103 | 2.5 | 4.5 | do | .90 | >1.0 |
| 7 | 173 | 29.0 | 3.42 | Good | 1.0 | .05 |

[1] Samples 1, 2, 3, and 7 were obtained from the Rohm & Haas Co. Samples 5 and 6 were resins manufactured by The Dow Chemical Co. and Sample 4 was obtained from Diamond-Shamrock Chemical Corp. All of the resins were styrene-divinyl benzene based resins containing quaternized ammonium groups and were macroporous except as noted.
[2] Percent resin swell is by volume and unsubstituted rings by weight.

EXAMPLE 15

Several resins were evaluated as before. Reaction product from each run was analyzed for weight percent 2-hydroxyethyl acrylate (2-HEA) and product impurities by gas-liquid chromatography. Soluble polymer and percent unreacted acrylic acid were also determined on each product. Two products (A and B) were analyzed for percent 2-HEA by saponification. The percent yield of 2-HEA was calculated for comparison of the two methods. Results were as follows:

TABLE III

| Resin | A | B | C | D |
|---|---|---|---|---|
| Resin swell, percent by vol | 125 | 50 | 136 | 107 |
| Unsubstituted aromatic rings, percent by wt | 26 | 3.2 | 24 | 30 |
| Ion exchange capacity (meq./g.) | 3.16 | 4.21 | 3.28 | 3.25 |
| Catalyst performance | Good | Poor | Good | Good |
| Relative reactivity | 0.96 | 0.36 | 0.93 | 0.92 |
| Relative polymer formation | 0 | >1.0 | 0.05 | 0.04 |
| 2-HEA yield by chromatography (wt. percent) | 96.3 | 90.0 | | |
| 2-HEA yield by saponification (percent) | 100.0 | 99.4 | | |

In the prior art (see U.S. 3,340,295) the high yields reported were obtained by a saponification analytical method. Because many of the reaction by-products are also saponifiable, the method using gas-liquid chromatography was employed with comparison being shown above in Table III.

In general good results are obtained when the acid is esterified with an alkylene oxide containing from 2 to 4 carbon atoms. It may, however, be desirable for at least one hydrogen atom of the alkylene oxide to be replaced by a halogen atom or an aromatic nucleus. The preferred oxides of the invention include ethylene oxide, propylene oxide, butylene oxides, epichlorohydrin and the like.

The reaction in question is one between equimolar quantities of acrylic or methacrylic acid and of the desired alkylene oxide. However, in order to ensure completeness of the reaction, it is desirable to employ an excess of the alkylene oxide. Thus, a ratio of from 1.2 to 20 mols of the alkylene oxide to 1 mol of the acid will generally be indicated. A ratio of 5 to 12 moles of oxide per mole of acid is preferred. The excess of oxide would be expected to promote the formation of the monoester of diethylene glycol which is formed in solution by a thermal reaction. To the contrary the excess is shown to actually inhibit the formation of this objectionable by-product.

The reaction may be conducted in the presence of a solvent for the reactants if desired, although this is not requisite. The presence of solvent tends to reduce the speed of the reaction. However, it also tends to interfere with the undesired polymerization reaction. Accordingly, the use of solvent may be advantageous when it is desired to carry out the reaction at the upper limit of the stated temperature range. As solvents for the reaction, aromatic hydrocarbons, such as benzene or toluene, are preferred materials. Nevertheless, other inert solvent materials may be employed, such as hexane, xylene and petroleum ether. Generally, the excess of oxide serves as the diluent and no other is needed.

The reaction according to the present invention is most suitably carried out at a temperature of 50° C. to 90° C. Preferred operating temperature is from about 60° to about 80° C. However, the reaction may be impractically slow at the lower temperature value and at the higher temperatures competing polymerization reactions become a serious consideration. The reaction is carried out under pressure which is generally autogenous and will depend upon the temperatures employed. The pressure must be sufficient to keep the reactants in the liquid phase.

The resin catalyst is insoluble in the reaction mixture and may be readily separated therefrom by decantation, filtration or like method. It may be re-used in subsequent reactions without further preparation, with manifest economy in both material and processing cost.

Inasmuch as it is possible to carry the reaction to substantial completion according to the present method, the omission of solvent makes it possible to obtain a product of sufficient purity for many purposes with only minimum processing of the reaction product being found necessary. The soluble resin catalyst may be completely removed therefrom by filtration. The low-boiling alkylene oxide may then readily be stripped from the residual material to give the desired product containing only minor amounts of the acid reactants. As stated, this minor amount of either acrylic or methacrylic acid is not objectionable for many purposes. A completely pure product is, of course, obtained by distillation at reduced pressure.

The method of the present invention is adapted to the preparation of the desired esters by either a batch or a continuous operation using fixed bed or fluid bed reactors. For a continuous process it is necessary only to provide a means whereby the reactants, with or without diluent, may be passed through a zone in which they are brought in flowthrough contact with the resin catalyst at reaction temperature. For example, the reactor may take the form of a length of tubing packed with particles of the quaternary ammonium ion exchange resin and fitted with heating means, means to admit to one end of the tubing the reaction mixture and means for controlling the flow of reaction product from the other end of the tubing.

Depending on the rate of feed of the reactants, the temperature of the reaction zone and the amount of catalyst, it is possible to continuously withdraw a reaction product containing an almost quantitative amount of desired product, based on the amount of acrylic or methacrylic acid fed, which is not contaminated with catalyst residues.

The following example is given for a continuous reaction conducted in pilot plant equipment.

EXAMPLE 16

Five cubic feet of the anion exchange resin, the properties of which were given in Run A of Table III, was placed in a column for use as a fixed bed reactor. Reactant flow was from the bottom of the column in an upward direction. The pressure was 150 p.s.i.g. and temperature was maintained at about 73° C., but did not exceed 75° C. The feed rate was 420 pounds/hour of ethylene oxide and 130 pounds/hours of acrylic acid. A portion of the product stream was recycled to assist in temperature control.

The product analyzed 96+% β-hydroxyethyl acrylate. The impurities present were about 1.6% acrylic acid, 0.7% of the monoester of diethylene glycol, <0.2% ethylene glycol diacrylate and <.02% polymer. The remainder of the impurities were hydroxyethyl esters of the impurities in the acrylic acid, e.g. diacrylic acid, methacrylic acid and acetic and propionic acids. Based on the acrylic acid converted, i.e. without impurities, the yield to β-hydroxyethyl acrylate was about 99%.

In the same pilot plant equipment employing resins having the desired properties, propylene oxide and 1,2-butylene oxide were reacted with acrylic acid with substantially the same result, i.e. producing the respective β-hydroxyalkyl esters of acrylic acid. Methacrylic acid was also reacted with ethylene and propylene oxides, respectively, to obtain the β-hydroxyethyl and propyl esters of methacrylic acid by employing a resin of the invention as catalyst. Substantially the same good yields of desired product with low polymer and by-product formation were obtained in each case.

We claim:

1. In a process for making hydroxyalkyl esters wherein an alkylene oxide having from 2 to 4 carbon atoms and an unsaturated carboxylic acid are reacted in the presence of a strong base anion exchange resin the improvement which comprises employing a strong base macroporous styrene-divinylbenzene anion exchange resin which is characterized by having: (1) a water swelling capacity of about 75% to 250% by volume, (2) a dry weight anion-exchange capacity of about 2 to 4 meq./g. in chloride form and (3) about 5% to 50% by weight of unsubstituted aromatic rings.

2. The process of claim 1 wherein the anion exchange resin is characterized by having (1) a water swelling capacity of about 100% to 200% by volume, (2) an anion-exchange capacity of from about 2.5 to about 3.8 meq./g. and (3) about 15% to 40% by weight of unsubstituted aromatic rings.

3. The process of claim 2 wherein the anion exchange resin is prepared from a macroporous styrene-divinylbenzene copolymer containing about 4-7% by weight divinylbenzene.

4. The process of preparing a hydroxyalkyl ester of acrylic or methacrylic acid employing an anion exchange resin which comprises reacting by contacting an alkylene oxide with acrylic or methacrylic acid in the ratio of 1.2 to 20 moles of the oxide per mole of acid at a temperature of from about 50° to about 90° C. under a pressure sufficient to maintain the reactants in the liquid phase in the presence of a macroporous strong base styrene-divinylbenzene anion-exchange resin characterized by having (1) a water swelling capacity of about 75% to 250% by volume, (2) a dry weight anion-exchange capacity of about 2 to about 4 meq./g. in chloride form and (3) about 5% to about 50% by weight of unsubstituted aromatic rings.

5. The process of claim 4 wherein the mole ratio of the oxide to acid is at least 5:1, the temperature of reaction is within the range of from about 60° C. to about 80° C. and wherein the anion-exchange resin is characterized by having (1) a water swelling capacity of about 100% to 200% by volume, (2) an anion-exchange capacity of about 2.5 to about 3.8 meq./g. and (3) about 15% to about 40% by weight of unsubstituted aromatic rings.

6. The process of claim 5 wherein the anion-exchange resin is prepared from a macroporous styrene-divinylbenzene copolymer containing about 4-7% by weight divinylbenzene.

7. The process of claim 5 wherein the alkylene oxide is ethylene oxide.

8. The process of claim 5 wherein the alkylene oxide is propylene oxide.

9. The process of claim 5 wherein the alkylene oxide is 1,2-butylene oxide.

References Cited
FOREIGN PATENTS
994,504   6/1965   Great Britain _____ 260—486 B LORRAINE A. WEINBERGER, Primary Examiner P. J. KILLOS, Assistant Examiner

PO-1050
(5/69)

UNITED STATES PATENT OFFICE
CERTIFICATE OF CORRECTION

Patent No. 3,804,884  Dated April 16, 1974

Inventor(s) Gaines Clayton Jeffrey and Wallace Eldon Embrey

It is certified that error appears in the above-identified patent and that said Letters Patent are hereby corrected as shown below:

Col. 1, line 45, delete volume.

Col. 3, line 9, "sweling" should be changed to --swelling--.

Col. 4, Table I ".7" should be changed to --8.7--.

Col. 4, Table I "meg" should be changed to --meq--.

Col. 4, Table II "meg" should be changed to --meq--.

Col. 4, Table II "3.42" should be changed to -3.43--.

Col. 5, line 75 "soluble" should be --insoluble--.

Signed and sealed this 22nd day of October 1974.

(SEAL)
Attest:

McCOY M. GIBSON JR.
Attesting Officer

C. MARSHALL DANN
Commissioner of Patents